United States Patent [19]

Saam et al.

[11] 4,273,634
[45] Jun. 16, 1981

[54] PRECURED SILICONE EMULSION AND METHOD FOR PREPARATION

[75] Inventors: John C. Saam, Midland; Robert L. Wegener, Bay City, both of Mich.

[73] Assignee: Dow Corning Corporation, Midland, Mich.

[21] Appl. No.: 94,268

[22] Filed: Nov. 14, 1979

[51] Int. Cl.³ .................. C08L 83/06; C08F 77/40
[52] U.S. Cl. ........................ 204/159.15; 204/159.13; 260/29.2 M; 525/477
[58] Field of Search ............ 260/29.2 M; 106/287.15, 106/287.13, 287.14; 204/159.13, 159.15; 525/477; 528/24, 32

[56] References Cited

U.S. PATENT DOCUMENTS

| | | | |
|---|---|---|---|
| 2,881,146 | 4/1959 | Remer | 260/29.2 |
| 3,294,725 | 12/1966 | Findlay et al. | 260/29.2 |
| 3,355,406 | 11/1967 | Cekada, Jr. | 260/29.2 |
| 3,624,017 | 11/1971 | Sorkin | 260/29.2 M |
| 3,706,695 | 12/1972 | Huebner et al. | 117/226 |

FOREIGN PATENT DOCUMENTS 862183  1/1971  Canada ............................. 260/29.2 M

*Primary Examiner*—Theodore E. Pertilla
*Attorney, Agent, or Firm*—James E. Bittell; Robert F. Fleming, Jr.

[57] ABSTRACT

An aqueous silicone emulsion is described which provides an elastomeric product upon removal of the water under ambient conditions. The emulsion comprises a continuous water phase and a dispersed phase of crosslinked silicone. The silicone phase is the product of radical produced crosslinking of hydroxyl endblocked polydiorganosiloxane. The polydiorganosiloxane is crosslinked after it has been dispersed in water. Preferred polydiorganosiloxanes contain vinyl-substituted siloxane units and can be crosslinked by high energy radiation or the combined action of heat and an organic peroxide.

11 Claims, No Drawings

PRECURED SILICONE EMULSION AND METHOD FOR PREPARATION

BACKGROUND OF THE INVENTION

This invention relates to an aqueous silicone emulsion which provides elastomeric products upon removal of water. This invention also relates to methods of preparation of such emulsions.

Emulsions of organopolysiloxanes have been known for many years and have been suggested for depositing both plastic and elastomeric silicone coatings. Such emulsion coating systems are especially desirable because of the absence of organic solvent which reduces toxicity, pollution and fire hazards.

Findlay et al. in U.S. Pat. No. 3,294,725 describe one approach to a silicone emulsion coating system which employs a copolymer of diorganosiloxane units and monoorganosiloxane units. The copolymer is prepared by anionic emulsion polymerization with a surface active sulfonic acid catalyst. Findlay et al. teach that the copolymer containing pendant and terminal silanol functionality does not appear to be gelled in the emulsion, but when removed from the emulsion, the copolymer gels to a crosslinked rubber upon heating. It is taught that fillers can be added to the emulsion to improve the strength of the rubber obtained from the emulsion.

Sorkin in U.S. Pat. No. 3,624,017 discloses a silicone emulsion system that rapidly cures on substrates at elevated temperatures to give a release coating. Sorkin employs an anionic emulsion polymerized copolymer similar to the copolymer employed by Findlay et al. (i.e. containing both diorganosiloxane units and monoorganosiloxane units) except that the ratio of monoorganosiloxane to diorganosiloxane units is higher. In addition, an organometallic curing catalyst such as dibutyltin dilaurate was included to effect the fast cure of the copolymer on the substrate.

Cekada in U.S. Pat. No. 3,355,406 describes another approach to a silicone emulsion coating system employing essentially linear hydroxyl endblocked polydialkylsiloxane. An emulsion of the polydialkylsiloxane is combined with a silsesquioxane in the form of a colloidal suspension or gel and with a crosslinking agent such as methyltrimethoxysilane. When a condensation catalyst such as dibutyltin dilaurate is added, the emulsion will form a silicone rubber film when the water is evaporated at room temperature. Cekada also suggests that a peroxide catalyst could be used instead of the condensation catalyst to obtain an emulsion which upon removal of water would deposit a silicone film which could then be cured to a rubber by applying heat. Cekada further suggests that without any catalyst a deposited film might be converted to a rubber by irradiation.

Huebner et al. in U.S. Pat. No. 3,706,695 describes a silicone emulsion system similar to Cekada's except that carbon black is employed instead of the silsesquioxane for reinforcement. The use of carbon black also makes the rubber product electrically conductive. Huebner et al. further teach that the emulsion containing both the organometallic condensation catalyst and the monoalkyltrialkoxysilane crosslinking agent will cure to a useful silicone rubber up to two weeks or more, but after longer storage will not cure satisfactory. Although the cure could be regenerated by adding additional catalyst and crosslinking agent, it was recommended for purposes of storage that the emulsion be contained in two or more packages.

Nelson in Canadian Pat. No. 862,183 describes a silicone emulsion for treating fiberglass. The emulsion is similar to the Cekada or Huebner et al. systems but does not contain a reinforcing filler. It consists essentially of an emulsion of hydroxyl endblocked polydimethylsiloxane, a crosslinking silane such as an alkyltrialkoxysilane or an alkylorthosilicate, and a siloxane condensation catalyst. The emulsion must be heated to cure it on the fiberglass. Nelson also teaches that it is preferred to keep the condensation catalyst separate from the remaining emulsion by using a two bath system for treating the fiberglass.

A silicone emulsion system is also described in copending U.S. patent application Ser. No. 901,052, filed Apr. 28, 1978 and assigned to the same assignee as the present patent application. The emulsion system employs an anionically stabilized hydroxylated polydiorganosiloxane combined with a colloidal silica with the pH adjusted within the range 9 to 11.5. The resulting silicone emulsion does not provide a cured elastomeric product when the water is allowed to evaporate at ambient conditions immediately after the emulsion is prepared. However, if this silicone emulsion is aged at room temperature for an extended storage period such as five months, it does provide cured elastomeric products when the water is removed. It is further taught that this required storage period can be reduced to one to three days if a diorganotindicarboxylate is added to the emulsion. The presence of colloidal silica is required for a useful cure either with or without the diorganotindicarboxylate.

A silicone emulsion is also described in copending U.S. patent application Ser. No. 64,152, filed Aug. 6, 1979 and assigned to the same assignee as the present patent application. The emulsion system employs an anionically stabilized graft copolymer of a water soluble silicate and a hydroxyl endblocked polydiorganosiloxane formed and stabilized in emulsion at a pH of 8.5 to 12.

An aqueous emulsion of a crosslinked silicone and a method of preparing the emulsion is described in copending U.S. patent application Ser. No. 71,459, filed Aug. 31, 1979 and assigned to the same assignee as the present patent application. The emulsion is prepared by emulsifying in water and surfactant, a vinyl endblocked polydiorganosiloxane, an organosilicon compound having silicon-bonded hydrogen atoms, adding a platinum catalyst and then heating the emulsion to effect crosslinking of the silicone within the emulsion particles. The emulsion of crosslinked silicone produces an elastomeric product upon evaporation of water and can be used to coat substrates.

SUMMARY OF THE INVENTION

This invention relates to an aqueous silicone emulsion which provides an elastomeric product upon removal of water under ambient conditions, comprising a continuous water phase and a dispersed phase of crosslinked silicone. Further, the invention relates to a method of preparing such an emulsion by first forming a stabilized dispersion of hydroxyl endblocked polydiorganosiloxane in water, with the polydiorganosiloxane containing sufficient vinyl substituted siloxane units to facilitate the crosslinking of the polydiorganosiloxane and having a weight average molecular weight of at least 5,000, and then treating the dispersion to provide a crosslinking action by forming radicals within the dispersed polydiorganosiloxane. Drying a film of this emulsion on a substrate can be used for example to provide a continuous elastomeric coating for the substrate.

DESCRIPTION OF THE INVENTION

The compositions of this invention are emulsions comprising a continuous water phase and a dispersed phase of crosslinked silicone. The crosslinked silicone in the emulsions of this invention is a product obtained by the action of radicals on a vinyl-containing hydroxyl endblocked polydiorganosiloxane.

These silicone emulsions have utility in forming continuous elastomeric silicone products or coatings. For example, when the silicone emulsion is spread on a substrate, the water evaporates to leave a continuous cured silicone rubber coating. The coating will not redisperse in water or dissolve significantly or organic solvents that commonly dissolve silicones.

The hydroxyl endblocked polydiorganosiloxanes useful for this invention are those which can be emulsified, which will impart elastomeric properties to the product obtained, and which can be readily crosslinked by radical reactions. The term "hdroxyl endblocked polydiorganosiloxane" is understood to describe an essentially linear polymer of repeating diorganosiloxane units containing no more than small impurities of monoorganosiloxane units. The hydroxyl endblocked diorganosiloxane will therefore have essentially two silicon-bonded hydroxyl radicals per molecule.

To impart elastomer properties to the product obtained after removal of the water from the emulsion, the polysiloxane should have a weight average molecular weight ($M_w$) of at least 5,000. Polysiloxanes with low ($M_w$) do not provide strong elastomeric products, but are useful for certain coating applications. Tensile strengths and elongations at break improve with increasing molecular weight with reasonable tensile strengths and elongations obtained above 30,000 $M_w$ and the best tensile strengths and elongations obtained above 50,000 $M_w$. The maximum $M_w$ is one which can be emulsified and which will give elastomeric properties to the product obtained after the water is removed from the emulsion. Weight average molecular weights up to about 1,000,000 for the polysiloxane are expected to be practical for this invention. The preferred $M_w$ for the hydroxyl endblocked polydiorganosiloxane is in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl.

The hydroxyl endblocked polydiorganosiloxane must be susceptible to crosslinking by radical reactions to be useful in the present invention. U.S. Pat. Nos. 2,481,052 and 3,090,738 describe polydiorganosiloxanes that are susceptible to crosslinking by radical reactions. The preferred polydiorganosiloxanes for the present invention contain vinyl-substituted siloxane units. The vinyl-substituted siloxane units enhance the susceptibility of the polydiorganosiloxane to crosslinking by radical reaction and thus facilitate the crosslinking of the polydiorganosiloxane in the dispersion. As long as the polydiorganosiloxane contains sufficient vinyl-substituted siloxane units to facilitate the crosslinking of the polydiorganosiloxane in the dispersion, the amount of vinyl-substituted siloxane units in the polydiorganosiloxane is not critical. Typically, preferred polydiorganosiloxanes contain about 0.03 to 0.06 mole percent of the vinyl-substituted siloxane units. Generally, the amount of vinyl-substituted siloxane units that is sufficient to facilitate the crosslinking depends on the extent of polymerization of the polydiorganosiloxane. One skilled in the art will understand that the low levels of vinyl-substituted siloxane are sufficient to facilitate the crosslinking of high molecular weight polymers while somewhat higher levels are preferred with lower molecular weight polymers.

The most preferred polydiorganosiloxanes are copolymers containing dimethylsiloxane units and methylvinylsiloxane units. These copolymers are well known in the art and have often been crosslinked by radical reactions. The ratio of methylvinylsiloxane units to dimethylsiloxane units in the preferred polydiorganosiloxane is not critical provided the copolymer contains sufficient methylvinylsiloxane units to facilitate the crosslinking of the copolymer in the dispersion. One skilled in the art will understand that the extent of crosslinking in the siloxane can be varied as desired by adjusting either the amount of methylvinylsiloxane units in the copolymer or the amount of radical initiation employed.

To prepare the silicone emulsions of this invention, one first forms a stabilized dispersion of the polydiorganosiloxane in water. For the purposes of this invention the term "stabilized" means the polydiorganosiloxane is stabilized in the dispersion with a surfactant. Stabilized dispersions of polydiorganosiloxanes can be formed in several ways. One method for forming the emulsion is to mix the polydiorganosiloxane, a surfactant and water and then pass the mixture through one of the well-known and commercially available homogenizer machines. The surfactant can be any of the emulsifying agents known to be useful to form aqueous silicone emulsions and can be an anionic, cationic or nonionic surfactant.

The preferred method of forming the dispersion is to prepare the polydiorganosiloxane by emulsion polymerization. In this method the polydiorganosiloxane is actually prepared in an emulsion by polymerization or copolymerization of diorganosiloxane cyclics or linear oligomers. Methods of emulsion polymerization for siloxanes are described in U.S. Pat. Nos. 3,294,725 and 2,891,920 which are hereby incorporated by reference to show the method of polymerization and to show the cationic, anionic and nonionic surfactants which can be used to form aqueous siloxane dispersions.

The most preferred method of emulsion polymerization is the method of anionic emulsion polymerization described in U.S. Pat. No. 3,294,725. Dispersions prepared by this method have excellent stability which makes them well suited for use in the present invention.

The concentration of the hydroxyl endblocked polydiorganosiloxane in the stabilized emulsion is not critical, however, for convenience one should use a concentration which is in line with the concentration of the dispersed phase desired in the final silicone emulsion.

After the dispersion of polydiorganosiloxane has been made, it is then treated to form radicals within the dispersed polydiorganosiloxane to initiate crosslinking of the silicone. Any of the methods known in the art to produce radicals that will crosslink the polydiorganosiloxanes can be employed in the present invention as long as the radicals can be generated within the dispersed silicone droplets without breaking or coagulating the dispersion. Generally, crosslink-inducing radicals can be produced in the polydiorganosiloxane emulsion droplets by energy activation of the polydiorganosiloxane directly or by energy activation of radical-producing agents dissolved in the droplets.

A method of producing radicals by energy activation of the polydiorganosiloxane directly is to expose the dispersion to high energy radiation. High energy radiation is generally defined as radiation having energies within the range of 1.6 fJ to 16,000 fJ and is known to initiate crosslinking in polydiorganosiloxanes from U.S. Pat. No. 3,090,738. It is anticipated that any of the types of high energy radiation including gamma, beta and X-ray radiation can be employed to provide the crosslinking action within the dispersed polydiorganosiloxane. In the present invention gamma radiation is preferred because it more effectively penetrates the aqueous phase of the dispersion to initiate radical formation within the silicone phase.

Another method of producing radicals is by energy activation of radical-producing agents which are dissolved in the silicone droplets of the dispersion. When this method is employed, a radical-producing agent which is soluble in polydiorganosiloxanes is first added to the dispersion of polydiorganosiloxane. Once the agent has been dissolved in the silicone droplets, energy is introduced into the emulsion system to cause the radical-producing agent to dissociate into radicals. The particular means of introducing the energy into the system is not critical to the present invention. Any means of introducing the energy into the system which supplies the energy to the agent within the silicone droplet without breaking or coagulating the emulsion can be employed. For example energy can be introduced into the system thermally, chemically (redox systems) or photochemically.

In a preferred embodiment of the present invention a polydiorganosiloxane soluble agent that produces radicals at elevated temperatures is introduced into the dispersion of polydiorganosiloxane. The dispersion is agitated to aid solution of the agent in the siloxane droplets and then heated to the elevated temperature at which the agent produces radicals. The dispersion can be heated to temperatures below 100° C. at atmospheric pressure or to temperatures above 100° C. by maintaining sufficient pressure to prevent boiling of the emulsion. Of course, the required temperature will depend on the particular radical-producing agent employed in the emulsion.

Radical-producing agents that are useful in the present invention include any of the well-known organic peroxides which are suitable for vulcanizing silicone rubber. These organoperoxide vulcanizing agents include, benzoyl peroxide, tertiary butylperbenzoate, dicumyl peroxide, 2,4-dichlorobenzoyl peroxide, di-tertiary-butyl peroxide, para-dichlorobenzoyl peroxide, 2,5-bis-(tert.-butylperoxy)-2,5-dimethylhexane, tertiary-butyl-triethylmethyl peroxide, tertiary-butyl-tertiary-triptyl peroxide, monochlorobenzoyl peroxide, and tertiary-alkylperoxyalkyl carbonates such as t-butylperoxyisopropylcarbonate.

The crosslinked silicone emulsion according to this invention is similar to uncrosslinked silicone emulsions in appearance. It is a fluid material which can be pumped, spread and otherwise manipulated like other silicone emulsions. The crosslinked silicone emulsion of this invention has the advantage of maintaining a consistent cure after extended storage because the crosslinking of the silicone has already been completed so that the problem of a cure system that continuously reacts and changes during storage is avoided. Additionally, the silicone emulsion will provide a cured elastomeric product even when dried immediately after the crosslinking is effected so that no aging period is required for the emulsion to develop the ability to cure.

The silicone emulsion as defined by this invention produces comparatively weak elastomeric films or coatings upon evaporation of water. Such films are useful for impregnating fibrous materials or porous materials and for coating substrates, such as paper, metal and cloth wherein toughness is not required. To produce stronger films or coatings, a reinforcing filler such as colloidal silica can be added to the crosslinked silicone emulsion. The filler is preferably added to the emulsion as an aqueous dispersion after the crosslinking step. Films or coatings obtained from emulsions which contain fillers such as colloidal silica for example are considerably stronger. The stronger films are more suited for use without a substrate and provide tougher coatings for substrates as well. Fillers can also be added to the emulsions to extend or pigment the elastomeric product. Useful fillers include colloidal silica, carbon black, clay, alumina, calcium carbonate, quartz, zinc oxide, mica, titanium dioxide and others well known in the art.

The emulsions can be applied to textiles, paper and other substrates to provide a coating which imparts release properties to substrates, water repellent characteristics to substrates or insulating properties to substrates such as heat and electrical insulation. The film or coating described above is not intended to be limited to a sheet-like configuration, but is intended to include impregnation wherein the coating or film may cover a thread, particle or fiber.

The evaporation is not limited to that evaporation resulting from unattended exposure of a deposit of emulsion to the atmosphere. Evaporation may additionally be assisted by a flow of dry air or other gas, either at ambient temperature or at an elevated temperature, by infrared heating or a combination of the various means. Care should be taken when accelerated means are used to evaporate the aqueous phase, that the rapidly leaving water vapor does not produce undesirable discontinuities in the film, if a continuous film or coating is desired.

The silicone emulsions of the present invention may contain additional ingredients to modify the properties of the emulsions or the elastomeric products obtained from the emulsion. For example, a thickener may be added to modify viscosity of the emulsion or to provide thixotropy for the emulsion. Also an antifoam may be added to reduce foaming during preparation or use.

The following examples are presented for purposes of illustrating the invention and should not be construed as limiting the scope of the invention which is properly delineated in the claims.

EXAMPLE 1

A copolymer was prepared by mixing 4.11 g of bis(N-methylacetamido)methylvinylsilane with 1000 g of hydroxyl terminated polydimethylsiloxane having a number average molecular weight of about 2000. The copolymer was homogenized in a solution of 13.9 g of sodium lauryl sulfate and 1032 g of distilled water to yield a uniform dispersion. Then 11.1 g of dodecylbenzenesulfonic acid was added to the dispersion and the system was held at about 22° C. overnight. The emulsion polymerization was terminated by adding sufficient 5% aqueous sodium hydroxide to bring the emulsion polymer to a pH of 11.1

The emulsion polymer was exposed to 4.0 Mrad of $Co^{60}$ radiation. The pH of the emulsion after irradiation was 10.06. Portions of the emulsion were adjusted to various pH levels by the addition of acidic ion exchange resins. The resins were removed by filtration. Films were prepared by spreading the emulsion on a polytetrafluoroethylene surface and allowing the water to evaporate at room temperature. The percent by weight swell and gel (insoluble fraction) of the elastomeric films were determined in water and cyclohexane. The results are shown in Table I and are compared to the results obtained with a non-irradiated portion of the same emulsion polymer.

TABLE I

| pH | % Swell water | % Gel water | % Swell cyclohexane | % Gel cyclohexane |
|---|---|---|---|---|
| Control* | 86 | 98 | dissolved | 3 |
| 10.06 | 397 | 102 | 1,294 | 90 |
| 7.3 | 357 | 98 | 1,122 | 90 |
| 2.7 | 246 | 95 | 1,072 | 91 |
| 2.5 | 401 | 98 | 953 | 92 |

*Non-irradiated polymer presented for comparison purposes only.

EXAMPLE 2

A coating composition was prepared by combining 50 g of the radiation crosslinked emulsion of Example 1 with 25 g of aqueous colloidal silica containing 15 percent by weight solids as $SiO_2$ of an average particle size of about 40 Å. The composition was cast into films on a polytetrafluoroethylene surface and the water allowed to evaporate at room temperature. A continuous coherent film was formed which did not redisperse upon immersion in cyclohexane. The film had an ultimate tensile strength of 979 kPa and an ultimate elongation of 85 percent.

EXAMPLE 3

Benzoyl peroxide, 0.4 g, was mixed into 8 g of an emulsion containing 48 percent by weight hydroxyl endblocked polysiloxane having 96 mole percent dimethylsiloxane units and 4.0 mole percent methylvinylsiloxane units. The polysiloxane was prepared in emulsion by the procedure of Example 1 and had a weight average molecular weight of about 200,000. The mixture was heated for 2 hours at 70° C. Films of the mixture were cast on a polytetrafluoroethylene surface and allowed to dry overnight at room temperature. A continuous rubbery film was obtained that did not dissolve or disperse in heptane.

EXAMPLE 4

This example illustrates the change in relative emulsion particle diameter as determined by hydrodynamic chromotography that is observed after irradiation of the emulsion. An increase in the observed relative particle diameter is interpreted as an indication of increased rigidity of the emulsion particles which results from crosslinking within the emulsion particles.

A series of dimethylsiloxane copolymer emulsions containing varied amounts of methylvinylsiloxane units were prepared by an anionic emulsion polymerization procedure designed to provide a copolymer with a weight average molecular weight of about 200,000. Varied amounts of bis(N-methylacetamido)methylvinylsilane were mixed with 1000 g of hydroxyl terminated polydimethylsiloxane having a number average molecular weight of about 2000. The mixtures were allowed to stand 1 hour in a closed container and then were homogenized in a solution of 13.9 g of sodium lauryl sulfate and 1032 g of distilled water to yield uniform dispersions. Then 11.1 g of dodecylbenzenesulfonic acid was added to each dispersion and polymerization was allowed to proceed for 2 days at 22° C. Polymerization was terminated after 2 days at 22° C. by adding sufficient aqueous solution of 2 percent by weight sodium hydroxide to bring the emulsion to a pH above 10. Portions of each emulsion were exposed to 1 Mrad or 4 Mrad of $Co^{60}$ radiation.

A sample of each emulsion, diluted to about 0.1 percent by weight solids, was chromatographed on a 9 mm by 100 cm glass hydrodynamic chromatography column packed with sulfonic acid ion exchange resin in the $Na^+$ form having a particle size of about 20 μm. The relative emulsion particle diameter was obtained by comparison of the retention time of the polydiorganosiloxane emulsion with the retention times of monodispersed emulsions of polystyrene with known particle diameters. The data is presented in Table II.

In addition, films were prepared by spreading the emulsions on polytetrafluoroethylene, polyethylene, and glass surfaces and allowing the water to evaporate overnight at room temperature. The percent by weight swell and gel (insoluble fraction) of the elastomeric films were determined in heptane. The non-irradiated emulsions did not cure and were soluble in heptane after evaporation of the water.

The elongation at break and maximum tensile strength of films perpared from emulsions A and F that received 4 Mrad of irradiation were respectively 80 percent elongation with 171 kPa tensile and 60 percent elongation with 201 kPa tensile.

TABLE II

| Emulsion | Mole Fraction Vinylmethyl Siloxane Units × 10² | Relative Particle Diameter (Å) in Emulsion | | | Properties of Cast Films from Emulsions | | | |
|---|---|---|---|---|---|---|---|---|
| | | No Radiation | 1 Mrad | 4 Mrad | 1 Mrad % Swell | 1 Mrad % Gel | 4 Mrad % Swell | 4 Mrad % Gel |
| A | 0.070 | 2540 | 3320 | 2620 | 2905 | 80.6 | 2106 | 88.1 |
| B | 0.087 | 2240 | 2480 | 2840 | 3606 | 89.7 | 2153 | 84.3 |
| C | 0.105 | 2100 | 2620 | 2930 | 3425 | 71.1 | 2146 | 86.9 |
| D | 0.121 | 2510 | 2860 | 2950 | 3639 | 82.7 | 2210 | 86.0 |
| E | 0.138 | 2240 | 2860 | 2930 | 3532 | 78.9 | 1897 | 90.3 |

TABLE II-continued

| Emulsion | Mole Fraction Vinylmethyl Siloxane Units × 10² | Relative Particle Diameter (A) in Emulsion | | | Properties of Cast Films from Emulsions | | | |
|---|---|---|---|---|---|---|---|---|
| | | | | | 1 Mrad | | 4 Mrad | |
| | | No Radiation | 1 Mrad | 4 Mrad | % Swell | % Gel | % Swell | % Gel |
| F | 0.156 | 2400 | 2920 | 2950 | 2886 | 97.1 | 1786 | 90.2 |

EXAMPLE 5

This example illustrates the coating of paper by the emulsions of this invention to impart adhesive release properties to the paper.

The surface of bonded typing paper was coated with Emulsion F described in Example 4 that had been exposed to 1 Mrad (F-1) and 4 Mrad (F-4) of Co⁶⁰ irradiation prior to coating the paper. The coated paper was allowed to dry for one day at room temperature.

Strips of adhesive tape, 1.9 cm wide, were applied to the coated paper and the force required to peel the tape at an angle of 180° and at a rate of 8.467 mm/sec from the paper was measured. After the tape was peeled from the coated paper, it was applied to uncoated paper and the force required to peel this prior released tape was measured in the same way. For comparison, the force required to peel new tape from uncoated paper was measured under the same conditions. The data is presented in Table III.

TABLE III

| | Peel Force (g) | | |
|---|---|---|---|
| Emulsion | New Tape From Coated Paper | Prior Released Tape From Uncoated Paper | New Tape From Uncoated Paper |
| F-1 | 19 ± 5 | 99 ± 25 | 222 ± 32 |
| F-4 | 3.6 ± .3 | 186 ± 40 | 222 ± 32 |

EXAMPLE 6

A series of hydroxyl endblocked siloxane copolymers containing dimethylsiloxane units and methylvinylsiloxane units was prepared in emulsion by homogenizing mixtures of octamethylcyclotetrasiloxane and 1,3,5,7-tetravinyltetramethylcyclotetrasiloxane in 256 g of water and 4 g of dodecylbenzenesulfonic acid. The dispersions were heated for 18 hours at 70° C. and then allowed to equilibrate at room temperature for 24 hours. After the equilibration, each emulsion was neutralized by the addition of aqueous sodium hydroxide.

Next, 1 g of t-butyl perbenzoate was added to 20 g portions of each emulsion and the mixtures tumbled overnight on a mixing wheel. Each emulsion was then heated at 127° C. for 30 minutes in an autoclave. The emulsions were poured into polypropylene petri dishes and allowed to dry at 40° C. under a heat lamp. The emulsions formed continuous elastomeric films as shown in Table IV. The emulsions which were not heated with the peroxide did not cure.

TABLE IV

| Copolymer Components | | Mole percent | Chacterization of Film Cast from the Emulsion After |
|---|---|---|---|
| $(Me_2SiO)_4$ grams | $(MeViSiO)_4$ grams | MeViSiO Units | Heating with the Peroxide |
| 139.77 | 0.23 | 0.14 | Clear, Continuous, Soft, Elastomeric |
| 139.19 | 0.81 | 0.50 | Clear, Continuous, Elastomeric |
| 138.37 | 1.63 | 1.0 | Clear, Continuous, Elastomeric |
| 136.74 | 3.26 | 2.0 | Clear, Continuous, Elastomeric |
| 131.86 | 8.14 | 5.0 | Clear, Continuous, Hard, Friable, Elastomeric |

That which is claimed is:

1. An aqueous silicone emulsion which provides an elastomeric product upon removal of the water under ambient conditions, comprising a continuous water phase and a dispersed phase of crosslinked silicone prepared by
   (A) first forming a stabilized dispersion of hydroxyl endblocked polydiorganosiloxane in water, the polydiorganosiloxane containing sufficient vinyl-substituted siloxane units to facilitate the crosslinking of the polydiorganosiloxane and having a weight average molecular weight of at least 5,000, and then
   (B) treating the dispersion to provide a crosslinking action by forming radicals within the dispersed polydiorganosiloxane.
2. The aqueous silicone emulsion according to claim 1 in which the radicals are formed within the dispersed polydiorganosiloxane by exposing the dispersion to high energy radiation.
3. The aqueous silicone emulsion according to claim 1 in which the radicals are formed within the dispersed polydiorganosiloxane by the combined action of heat and a radical-producing agent.
4. The silicone emulsion according to claim 2 or 3 in which the polydiorganosiloxane is a copolymer containing dimethylsiloxane units and methylvinylsiloxane units.
5. The silicone emulsion according to claim 4 in which the copolymer has a weight average molecular weight of 200,000 to 700,000.
6. The silicone emulsion according to claim 2 or 3 in which the hydroxyl endblocked polydiorganosiloxane is an anionic emulsion polymerized copolymer of dimethylsiloxane units and methylvinylsiloxane units.
7. The silicone emulsion according to claim 1 in which there is also present a filler.
8. A method of preparing an aqueous silicone emulsion which provides an elastomeric product upon removal of the water under ambient conditions comprising
   (A) first forming a stabilized dispersion of hydroxyl endblocked polydiorganosiloxane in water, the polydiorganosiloxane containing sufficient vinyl-substituted siloxane units to facilitate the crosslinking of the polydiorganosiloxane, and having a weight average molecular weight of at least 5,000, and then (B) treating the dispersion to provide a crosslinking action by forming radicals within the dispersed polydiorganosiloxane.

9. The method according to claim 8 in which the dispersion of hydroxyl endblocked polydiorganosiloxane is formed by anionic emulsion polymerization of siloxanes selected from the group consisting of polydiorganosiloxane cyclics and hydroxyl endblocked polydiorganosiloxane oligomers.

10. The method according to claim 8 in which the radicals are formed within the dispersed polydiorganosiloxane by exposing the dispersion to high energy radiation.

11. The method according to claim 8 in which the radicals are formed within the dispersed polydiorganosiloxane by the combined action of heat and a radical-producing agent.

* * * * *

UNITED STATES PATENT AND TRADEMARK OFFICE
CERTIFICATE OF CORRECTION

PATENT NO. : 4,273,634

DATED : June 16, 1981

INVENTOR(S) : John C. Saam and Robert L. Wegener

It is certified that error appears in the above-identified patent and that said Letters Patent are hereby corrected as shown below:

Column 3, line 24; the word reading "hdroxyl" should read "hydroxyl".

Column 4, line 9; the number reading "0.06" should read "6.0".

Signed and Sealed this

Fifteenth Day of December 1981

|SEAL|

*Attest:*

*Attesting Officer*

GERALD J. MOSSINGHOFF

*Commissioner of Patents and Trademarks*